United States Patent
Frahm et al.

(10) Patent No.: US 7,310,842 B2
(45) Date of Patent: Dec. 25, 2007

(54) PORTABLE RAMP ASSEMBLY AND METHOD OF CONSTRUCTION

(75) Inventors: Jeffry R. Frahm, Frankenmuth, MI (US); Matthew A. Royalty, Midland, MI (US); Daniel C. Munn, West Branch, MI (US)

(73) Assignee: Magline, Inc., Pinconning, MI (US)

( * ) Notice: Subject to any disclaimer, the term of this patent is extended or adjusted under 35 U.S.C. 154(b) by 224 days.

(21) Appl. No.: 11/078,760

(22) Filed: Mar. 11, 2005

(65) Prior Publication Data

US 2006/0200919 A1 Sep. 14, 2006

(51) Int. Cl.
*E01D 1/00* (2006.01)

(52) U.S. Cl. ...................................... 14/69.5

(58) Field of Classification Search ................. 14/69.5; 404/34–36, 40, 46

See application file for complete search history.

(56) References Cited

U.S. PATENT DOCUMENTS

| | | | |
|---|---|---|---|
| 4,865,486 A * | 9/1989 | Bettigole | ..................... 404/75 |
| 5,199,150 A | 4/1993 | Mortenson | |
| 5,253,410 A | 10/1993 | Mortenson | |
| 5,347,672 A * | 9/1994 | Everard et al. | .............. 14/69.5 |
| 5,418,992 A * | 5/1995 | Alten | ......................... 14/69.5 |
| 5,740,575 A * | 4/1998 | Gordon | ..................... 14/69.5 |
| 5,815,870 A | 10/1998 | Deutch et al. | |
| 5,938,397 A * | 8/1999 | Schouest | .................... 414/537 |
| 6,536,064 B1 * | 3/2003 | Swink et al. | ................ 14/69.5 |
| 7,013,518 B2 * | 3/2006 | Leblanc | ...................... 14/69.5 |

* cited by examiner

*Primary Examiner*—Raymond W Addie
(74) *Attorney, Agent, or Firm*—Reising, Ethington, Barnes, Kisselle, P.C.

(57) ABSTRACT

A portable ramp assembly and method of construction provides a ramp assembly with a pair of side rails and a plurality of panels adapted for releasable attachment to the side rails. The panels have an upper support surface and a like lower support surface facing opposite the upper support surface. The panels are individually removable from the side rails to interchange the upper and lower support surfaces.

21 Claims, 6 Drawing Sheets

PORTABLE RAMP ASSEMBLY AND METHOD OF CONSTRUCTION

BACKGROUND OF THE INVENTION

1. Field of the Invention

This invention relates generally to ramps for use between a pair of surfaces of different elevation to facilitate transporting cargo from one of the surfaces to the other of the surfaces, and more particularly to ramps used to load and unload cargo from a vehicle trailer.

2. Related Art

When transporting numerous and/or heavy containers, generally, a large semi trailer, or the like, is used, and commonly, ramps are use to facilitate loading and removing the containers into and from the trailer. The ramps are typically built integrally into the trailer, and are pulled out from a rear portion of the trailer for use, and pushed back into the trailer for storage. These ramps can prove difficult to use when the tracks along which they slide become corroded, and from their being generally large, heavy and cumbersome. Otherwise, when the trailer does not have a built-in ramp, commonly, portable ramps are used. The portable ramps are typically formed having a single piece load support surface extending between one end arranged for attachment to the transport vehicle, and another end arranged for abutment with a ground surface. Some of these ramps are commonly constructed with nubs extending upwardly from the support surface to facilitate maintaining traction with the load surface in use. Unfortunately, when the nubs become worn, they are unable to be replaced, and thus, the ramp can become slippery after extended use. As a result, the ramp typically must be replaced with a new ramp.

SUMMARY OF THE INVENTION

A portable ramp assembly has a pair of laterally spaced side rails and a plurality of panels adapted for releasable attachment to a separate one of the side rails to form a generally planar support surface facing upwardly, and a generally planar surface facing downwardly. The panels are individually removable from the side rails so that opposite sides of the panels can be reversed to function as the upper support surface.

In another aspect of the invention, a method of constructing a portable ramp begins by providing a pair of elongate side rails and a plurality of cross members having opposite ends. Then, continuing by fixing one end of each cross member to one of the side rails, and fixing the other end of each cross member to the other of the side rails so that the side rails are rigidly spaced laterally from one another. Next, the method comprises providing a plurality of panels having opposite ends and releasably attaching one of the ends to one of the side rails, and the other of the ends to the other side rail to form a generally planar support surface facing upwardly and a generally planar idle facing downwardly.

Some of the potential objects, features, and advantages of at least some of the presently preferred embodiments of the invention include, but are not limited to, a portable ramp assembly that has individual load support panels that are reversible to provide a fresh traction surface, allow replacement of individual panels to extend the useful life of the ramp assembly, is economical in design and manufacture, is lightweight and durable, is easy to use, is relatively compact, and provides a long useful life.

BRIEF DESCRIPTION OF THE DRAWINGS

These and other objects, features, and advantages of the invention will become readily apparent in view of the following detailed description of the presently preferred embodiments and best mode, appended claims and accompanying drawings, in which:

DETAILED DESCRIPTION OF THE PREFERRED EMBODIMENTS

Figure 1:
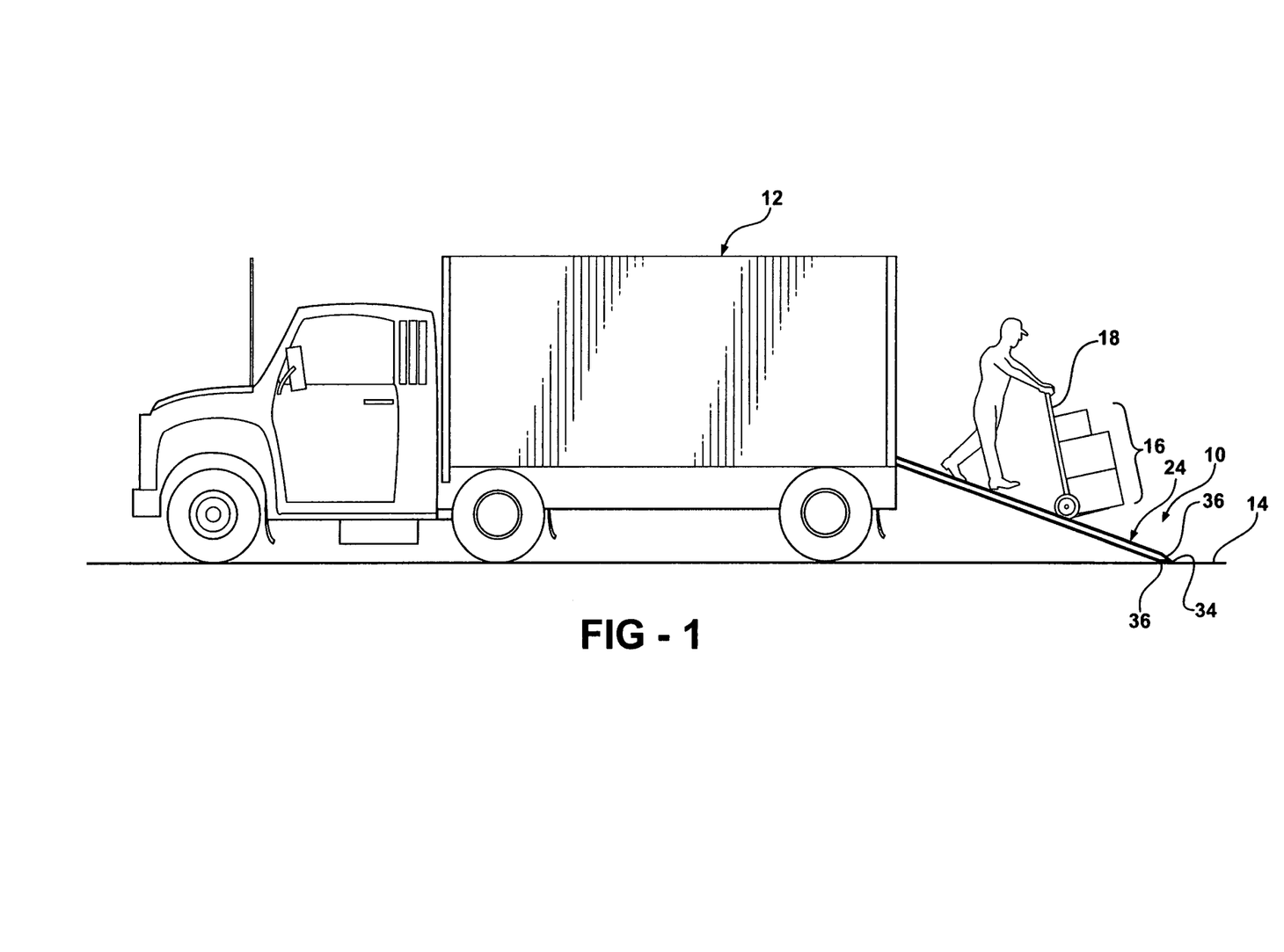
FIG. 1 is a side view of a portable ramp assembly according to one aspect of the invention.
Figure 3:
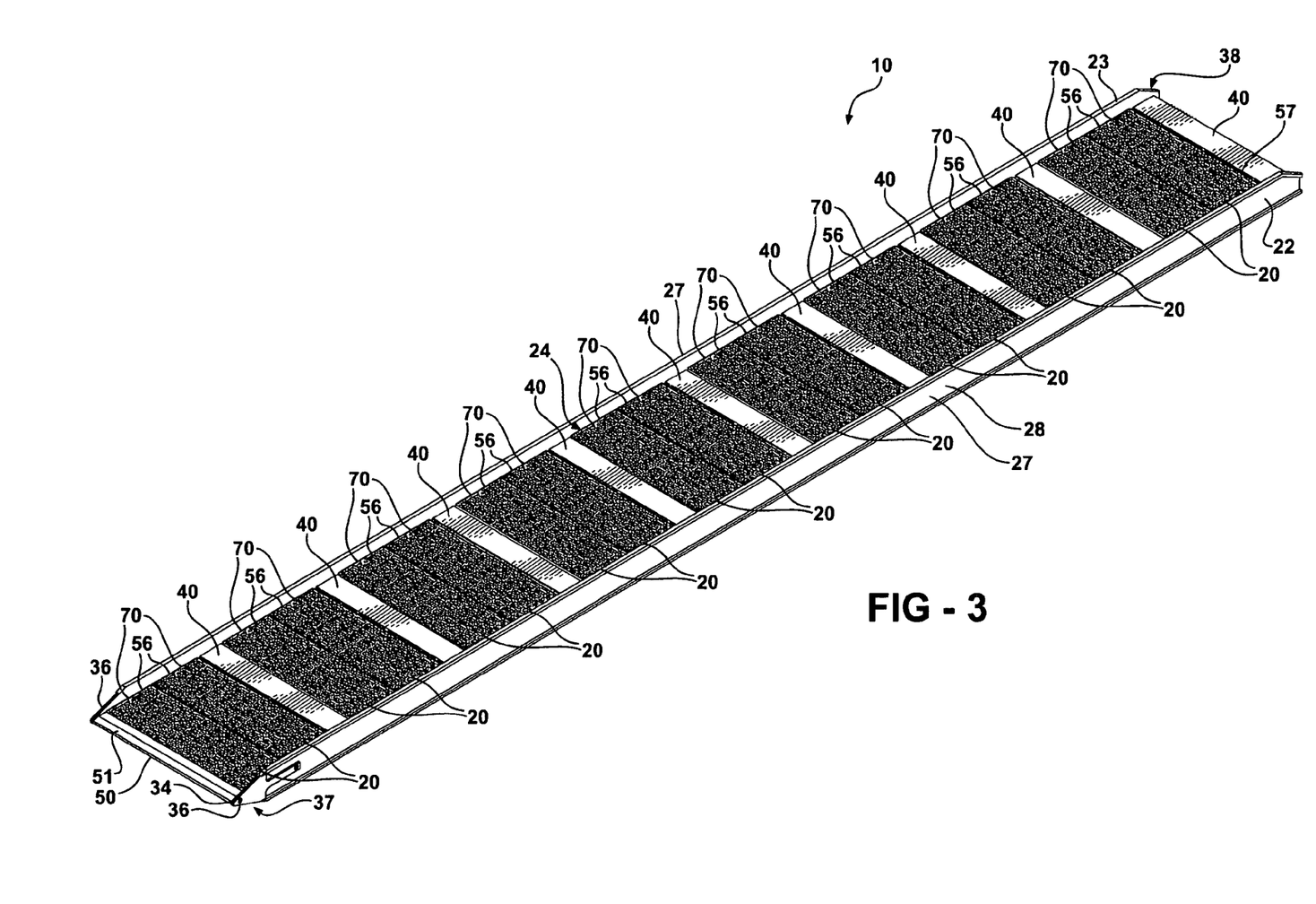
FIG. 3 is a fully assembled perspective view of the ramp assembly of FIG. 2.

Referring in more detail to the drawings, FIG. 1 illustrates a portable ramp assembly 10 in a secured position between a vehicle trailer 12 and a ground surface 14 to facilitate loading and unloading cargo 16 into and from the trailer, such as with the use of a hand truck 18, readily available from Magline, Inc., of Pinconning, Mich. As shown in FIG. 3, the ramp assembly 10 has a plurality of panels 20 extending between opposite side rails 22, 23 to provide a generally planar, upwardly facing support surface 24 to facilitate transporting the cargo 16 into and out of the trailer 12. The panels 20 are reversible in end-over-end fashion and interchangeable or individually replaceable to allow worn or damaged sections of the support surface 24 to be replaced in position to extend the useful life of the ramp assembly 10.

Figure 2:
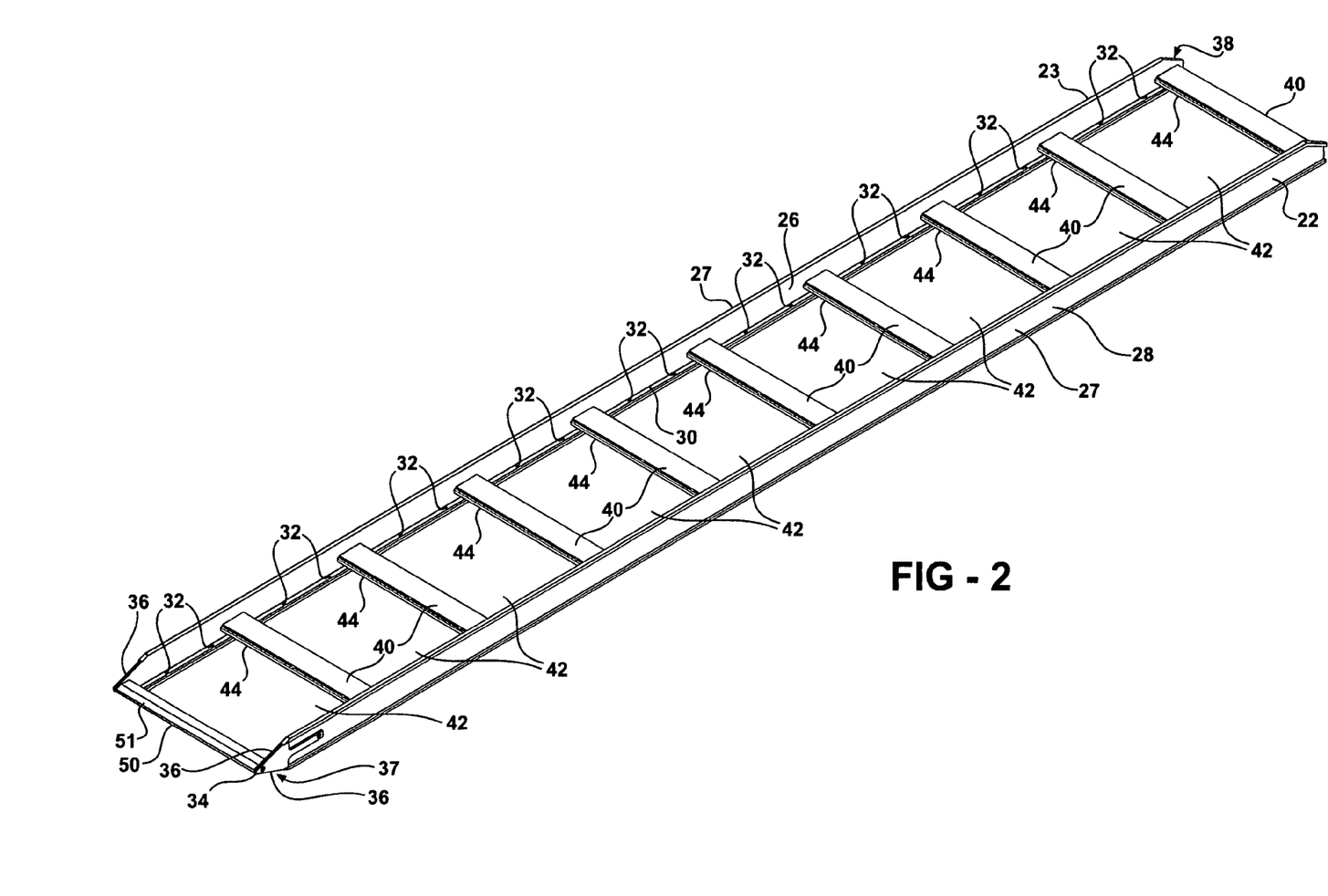
FIG. 2 is a partially assembled perspective view of the ramp assembly of FIG. 1 showing cross members maintaining a pair of side rails in laterally spaced relation.
Figure 4:
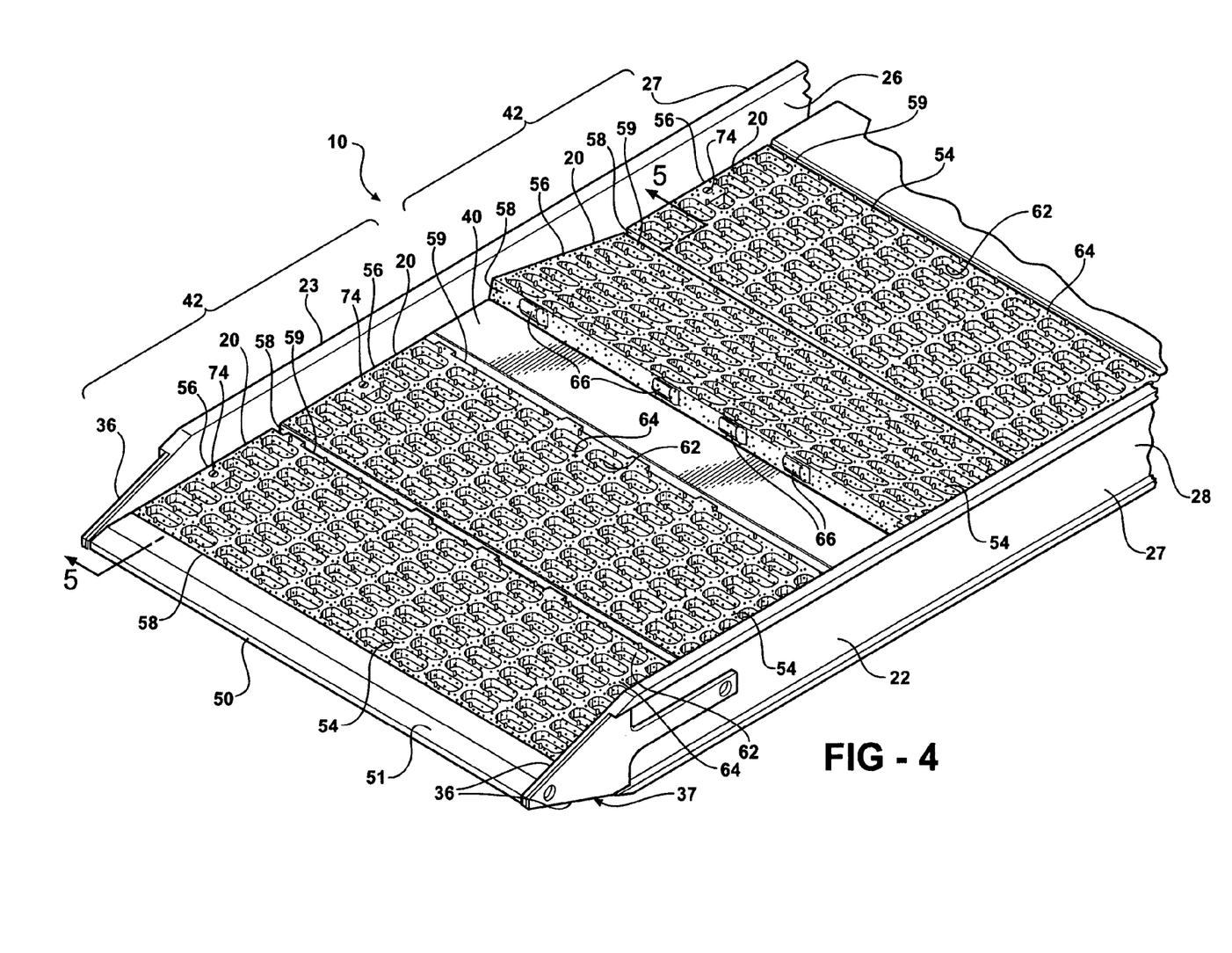
FIG. 4 is a partial perspective view of the ramp assembly of FIG. 3 showing a panel being releasably attached between the side rails.

The side rails 22, 23 are constructed from a rigid, high strength material, and are preferably formed from a high strength polymeric or metallic material, and more preferably are extruded from aluminum. As shown in FIGS. 2-4, the side rails 22, 23 are preferably formed as generally flat beams with opposite inner and outer sides 26, 27. The outer sides 27 preferably have a recessed channel 28 to facilitate weight reduction, and the inner sides 26 preferably have a panel supporting flange 30 (FIGS. 2, 5 and 6) extending laterally outwardly therefrom generally along the length of the side rails 22, 23. The flanges 30 are preferably formed as one piece with the side rails 22, 23, though they could be constructed separately from the side rails 22, 23, and thereafter, attached thereto, such as through a weld joint or fasteners, for example. The flanges 30 have a plurality of openings 32 (FIG. 2) spaced a predetermined distance from one another to facilitate attachment of the panels 20 to the side rails 22, 23. The side rails 22, 23 preferably have one end 34 with a convergent configuration, and shown here by way of example, as having converging opposite edges 36 to form a triangular nose portion 38 facilitating making a flat engagement between the nose portion 38 and the ground surface 14.

Figures 5, 6:
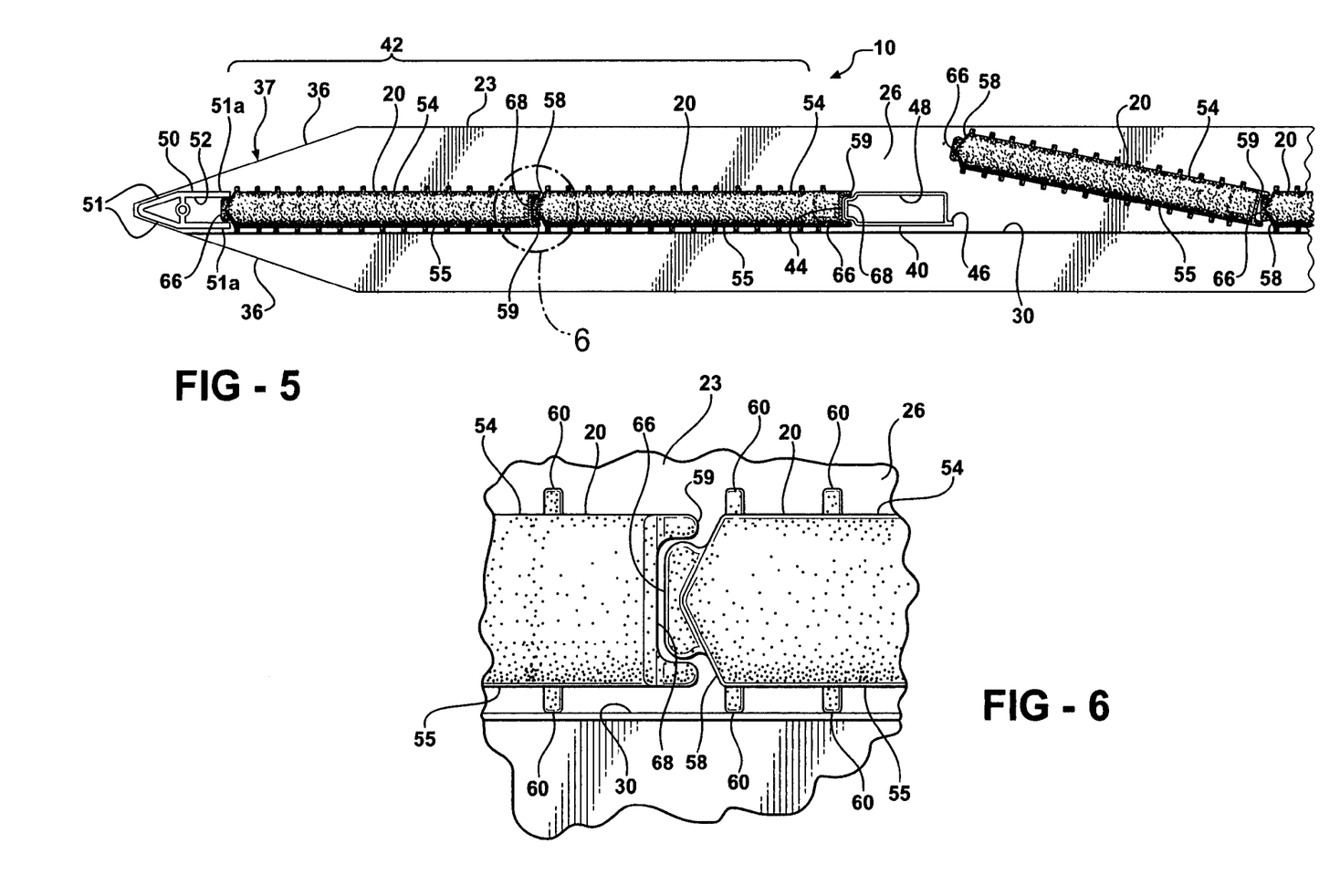
FIG. 5 is a cross-sectional view of the ramp assembly taken generally along line 5-5 of FIG. 4.
FIG. 6 is an enlarged view of the encircled area 6 of FIG. 5.

As shown in FIGS. 2 and 3, a relatively rigid ladder-like frame 38 is constructed by maintaining the side rails 22, 23 laterally spaced from one another by a plurality of cross members 40. The cross members 40 are preferably equal in length and fixed between the cross rails 22, 23, such as, by way of example and without limitations, through a weld joint or fasteners to maintain the cross rails 40 in a fixed, generally parallel relation to one another. The cross members 40 are preferably spaced equidistant from one another along the length of the side rails 22, 23 to define panel receiving openings or spaces 42 of equal size between the cross members 40 to receive a predetermined number of panels, and represented here, by way of example and without limitations, as a pair of panels 20 within each space 42. As best shown in FIG. 5, to facilitate receiving and maintaining the drop-in panels 20 within the spaces 42, the cross members 40 preferably have leading edges with an outwardly extending protrusion or tongue 44, and trailing edges with an flange or stop surface 46 extending outwardly and generally perpendicularly from the trailing edge, such that the stop surface 46 is generally laterally offset and parallel to the support surface 24. The cross members 40 are preferably constructed having a hollowed core 48, and are preferably extruded from aluminum. It should be recognized that the cross members 40 can be solid, and constructed using other rigid, high strength materials, such as high strength polymeric or fiber reinforced materials, for example, and that other manufacturing methods, i.e. molding, stamping and bending, could be used.

The ladder-like assembly 10 has a lower end cross member 50 with upper and lower surfaces 51 extending divergently so as to be generally triangular in cross section and conforming to the shape of the triangular nose portions 37 of the side rails 22, 23. As shown in FIG. 5, the lower end cross member 50 is preferably constructed from extruded aluminum stock, and preferably has ribs 51 a forming a receptacle 52 traversing a back side to facilitate assembly of the panels 20 within the opening 42 between the lower end cross member 50 and the next closest cross member 40.

The panels 20 may be die-cast from magnesium or aluminum, though other materials and processes, such as steel or high strength polymeric material and molding or extruding could be used to construct the panels. The panels 20 have opposite upper and lower grid sides 54, 55 preferably having an identical tread configuration extending between opposite ends 56, 57 defining opposite leading and trailing edges 58, 59. The opposite sides 54, 55 preferably have raised, outwardly extending protrusions or nubs 60 over their upper and lower surfaces to facilitate maintaining traction. In addition to, or in lieu of the nubs 60, the sides 54, 55 may have recessed or scalloped areas, thereby rendering the planar surface as the traction surface. As best shown in FIG. 4, to further increase the traction, promote drainage and reduce the weight of the assembly, the panels 20 preferably have a plurality of through openings 62. The through openings 62 are bounded by web portions 64 arranged in a honeycomb or grid configuration.

As shown in FIGS. 4-6, the leading edges 58 of the panels 20 are preferably formed having an outwardly extending tongue or protrusion 66 for positive supporting engagement with the flange or lip stop surfaces 46 of the cross members 40, and for interlocking receipt in the trailing socket or groove edge 59 of the adjacent panel 20. The protrusions 66 may extend intermittently or substantially across the leading edge 58. The trailing edges 59 of the panels 20 are formed with a lateral recess or channel 68 sized for receipt of the leading tongue edges 44 of the cross members 40 and the tongue 66 of an adjacent panel 20. The leading and trailing edges define a width of the panels, wherein the width is preferably defined so that a pair of panels 20 are received within each of the spaces 42 between a pair of the cross members 40. The opposite ends 56, 57 of the panels 20 define a length of the panels 20 which is such that the panels 20 preferably fit between the side rails 22, 23, but overlie the opposite flanges 30 on the side rails 22, 23. The panels 20 have fastener openings 70 (FIG. 3) adapted to align with the openings 32 in the flanges 30 and/or cross members 40 to facilitate attachment of the panels 20 to the side rails 22, 23 and/or cross members 40. Each panel 20 is shown here, by way of example, as being attached to the side rails 22, 23 via a pair of fasteners 72 (FIG. 4), such as standard bolts, adjacent the opposite ends 56, 57 of the respective panel 20, though more fasteners could be used in combination with more through openings in the side rails, if desired.

In assembly, the panels 20 are individually attached to the frame 38 via the fasteners 72. Within each space 42, a pair of panels 20 is disposed such that the channel 68 of a first panel 20 is disposed to receive the tongue 44 of one cross member 40, while the protrusion 66 on the opposite end of the first panel 20 is disposed within a channel 68 of a second adjacent panel 20. The protrusion 66 of the second panel 20 is then lowered for supporting engagement with the stop surface 46 of another cross member 40. This process is continued until all the panels 20 are attached to the frame 38. In the space 42 between the lower cross member 50 and the next closest cross member 40 (FIG. 5), the protrusion 66 of a first panel 20 is disposed in the receptacle 52 of the lower cross member 50, and the channel 68 of a second panel 20 receives the protrusion 66 of the cross member 40. Thereafter, the protrusion 66 of the second panel 20 is guided for receipt within the channel 68 of the first panel 20 as the first and second panels 20 are lowered into engagement with the flanges 30 of the side rails 22, 23. Thereafter, the fasteners 72 are inserted through the fastener openings 70 and into the openings 32 in the flanges 30 to secure the panels 20 in their releasably attached positions with conventional nuts. With the adjacent panels 20 being interlocked with one another, and with the panels 20 engaging respective ones of the cross members 40, any load applied to an individual panel 20 is uniformly distributed among the interlocked panels 20, and the cross members 40. As such, the individual panels 20 may be constructed having further reduced material content, as the entire applied load is not being borne by any single panel 20 at one time. Additionally, as one of the sides 54, 55 of the separate panels 20 becomes worn, damaged, or otherwise rendered undesirable for continued use, the respective panel 20 may be removed from the frame 38 by removing the associated fasteners 72, and then the panel 20 can be flipped end-over-end to bring the unused or fresh side 54, 55 from its idle position to the support position.

Figures 7, 8, 9:
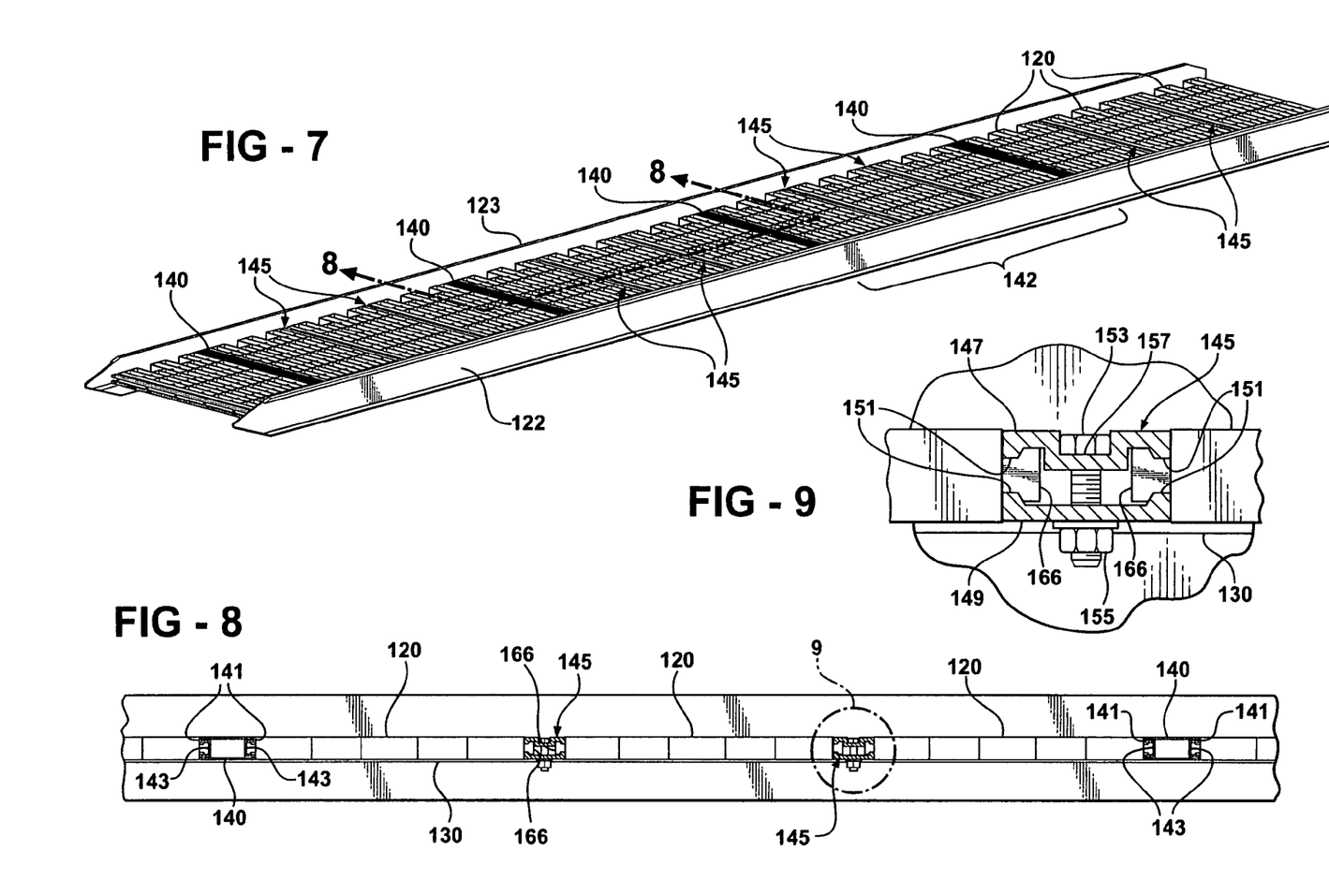
FIG. 7 is an assembled perspective view of another presently preferred embodiment of the invention.
FIG. 8 is a cross-sectional view of the ramp assembly taken generally along line 8-8 of FIG. 7.
FIG. 9 is an enlarged view of the encircled area 9 of FIG. 8.

As shown in FIG. 7, a ramp assembly 110 is constructed according to another presently preferred embodiment of the invention. The ramp assembly has a pair of side rails 122, 123 constructed generally the same as in the previous embodiment. The side rails 122, 123 have flanges 130 (FIGS. 8 and 9), on which cross members 140 are fixed or attached, such as through a weld joint or fasteners, for example. The flanges 130 have openings (not shown) spaced therealong at predetermined locations to facilitate attaching a plurality of panels 120 between the side rails 122, 123. The cross members 140 have opposite sides 141 extending between the side rails 122, 123 constructed for mating cooperation with the panels 120, and are shown here, by way of example and without limitations, as having recessed channels 143 therein. The channels 143 are sized for receipt of protrusions 166 extending from the sides of the panels 120 to interlock the panels 120 and cross members 140. As such, loads applied to the panels are distributed uniformly to the cross members 140.

As shown in FIGS. 7 and 8, by way of example and without limitation, three grid panels 120 are received within spaces 142 between adjacent cross members 140. The outer panels 120 adjacent the cross members 140 have one of the protrusions 166 inserted into the channels 143 in the cross members 140. The middle panel 120 is set between the outer panels 120, with the protrusions 166 of the middle panel 120 and the adjacent outer panels 120 being slightly spaced from one another to accommodate clamp assemblies 145. The panels 120 are preferably fastened to the flanges 130 of the side rails 122, 123 via fasteners, as in the previous embodiment.

As shown in FIG. 9, the clamp assemblies 145 have opposite elongate upper and lower plates 147, 149 arranged for attachment to one another and preferably to the flanges 130 of the side rails 122, 123 to facilitate maintaining the panels 120 in a releasably fixed position relative to the side rails 122, 123. The plates 147, 149 are arranged in overlying relation to portions of opposite sides of the adjacent panels 120 and are drawn toward one another to clamp on the portions of the panels 120 upon being attached to one another. As such, at least a portion of the adjacent panels 120 are received between the opposite upper and lower plates 147, 149. The plates 147, 149 are preferably extruded or molded from aluminum, though they could be formed from any suitable high strength resilient material, including high strength plastics, for example. The plates 147, 149 preferably have inwardly extending curled edges 151 that overlie the protrusions 166, preferably in a mating and generally conforming relation, and capture or clamp about the protrusions 166 extending from the edges of the adjacent panels 120. The plates 147, 149 are represented here, by way of example and without limitations, as being attached to one another via bolts 153 passing through axially aligned openings in the plates 147, 149, with standard nuts 155 being threaded onto the ends of the bolts 153. The upper plates 147 preferably have a counter bore or recessed channel 157 sized to receive the enlarged heads of the bolts 153 such that the bolts 153 remain generally flush or slightly recessed relative to the traction surface of the panels 120. When a panel or panels 120 become worn on one side, the respective nuts 155 and bolts 153 may be easily removed and the worn panels 120 may be flipped to bring a fresh side upward. The panels 120 are then reattached between the side rails 122, 123, at least in part, via the bolts 153 and nuts 155.

It should be recognized that upon reading the disclosure herein, that one ordinarily skilled in the art of would readily recognize other embodiments than those disclosed herein, with those embodiments being within the spirit and scope of the invention. Accordingly, the disclosure herein is intended to be exemplary, and not limiting. The scope of the invention is defined by the following claims.

We claim:

1. A portable ramp assembly, comprising:
a pair of side rails substantially equal in length; and
a plurality of panels each having opposite ends, one of said ends of each panel being adapted for releasable attachment to one of said side rails and the other of said ends of each panel being adapted for releasable attachment to the other of said side rails to present a generally upper planar support surface and a generally like planar lower surface opposite said support surface, said panels being removable from said side rails separately from one another to interchange said opposite sides, and wherein each of said panels has opposite edges extending between said opposite ends, one of said edges of one of said panels being configured to be interlockable with one of said edges of an adjacent one of said panels.

2. The assembly of claim 1 wherein one of said opposite edges of each panel has an outwardly extending protrusion, with the other of said opposite edges of each panel having a recess sized for receipt of an adjacent one of said protrusions.

3. The assembly of claim 1 further comprising a plurality of cross members fixed between said side rails and maintaining said side rails in a fixed relation to one another.

4. The assembly of claim 3 wherein said each of said cross members has opposite edges, one of said edges of one cross member being spaced from one of said edges of another cross member to define a space sized to receive a pair of said panels.

5. The assembly of claim 4 wherein one of said edges of each cross member is adapted to interlock with one of said edges of an adjacent one of said panels.

6. The assembly of claim 1 wherein said panels have opposite upper and lower grid sides with outwardly extending nubs to provide traction.

7. The assembly of claim 6 wherein said grid sides have through openings extending through said opposite sides.

8. The assembly of claim 1 wherein adjacent ones of said panels are constructed to engage one another in a manner to distribute loads between said adjacent panels.

9. The assembly of claim 1 further comprising a clamp assembly having a pair of opposite elongate plates arranged for attachment to one another in an overlying relation to adjacent ones of said panels to facilitate attaching said panels to said side rails.

10. The assembly of claim 9 wherein each of said panels has opposite edges with at least one edge of each panel being arranged for receipt between said plates of said clamp assembly.

11. The assembly of claim 10 wherein said at least one edge has an outwardly extending protrusion arranged to be clamped between said plates of said clamp assembly.

12. The assembly of claim 9 wherein said clamp assembly has opposite ends arranged for releasable attachment to said side rails.

13. A method of constructing a portable ramp assembly, comprising:
a. providing a pair of elongate side rails;
b. providing a plurality of cross members having opposite ends spanning said side rails;
c. fixing one end of each cross member to one of said side rails, and fixing the other of said ends of each cross member to the other of said side rails so that said side rails are rigidly spaced laterally from one another;
d. providing a plurality of grid panels, each of said panels having opposite ends with opposite sides extending between said opposite ends; and
e. releasably attaching said opposite ends of said panels to separate ones of said side rails and forming generally planar upper and lower reversible support surfaces.

14. The method of claim 13 wherein said side rails are extruded.

15. The method of claim 13 including interlocking pairs of adjacent panels together.

16. The method of claim 13 including interlocking each of said cross members with an adjacent panel.

17. The method of claim 16 including forming raised nubs extending outwardly from said opposite sides of said panels.

18. The method of claim 13 including providing a plurality of clamp assemblies each having upper and lower plates and fasteners for drawing said upper and lower plates toward one another, arranging said upper and lower plates in overlying relation to a portion of adjacent ones of said panels and attaching said upper and lower plates to one another with said fasteners.

19. A portable ramp, comprising:
a frame including a pair of side rails; and
a plurality of panels releasably attached to the frame and extending from one side rail to the other side rail to define at least part of a generally planar upper surface and a generally like lower surface opposite said upper surface, each panel being removable from said frame independently of and without having to remove the other panels from the frame to permit the upper surface and lower surface of a panel to be reversed.

20. The ramp of claim 19 wherein the panels are releasably attached to the side rails.

21. The ramp of claim 19 wherein the frame also includes at least one cross member extending between and interconnecting the side rails and the panels are releasably attached to at least one of the frame or said at least one cross member.

* * * * *